(12) United States Patent
Jackson et al.

(10) Patent No.: US 9,245,458 B2
(45) Date of Patent: Jan. 26, 2016

(54) SYSTEMS AND METHODS FOR USING IMAGES TO GENERATE DIGITAL INTERACTION

(71) Applicant: Kimberly-Clark Worldwide, Inc., Neenah, WI (US)

(72) Inventors: Kelly Wade Jackson, Appleton, WI (US); Anita Marie-Nanette Gilgenbach, Neenah, WI (US); Carolyn Marie Eisele, Neenah, WI (US); Adam Howard Dreyer, Appleton, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 254 days.

(21) Appl. No.: 13/691,257

(22) Filed: Nov. 30, 2012

(65) Prior Publication Data

US 2014/0154654 A1    Jun. 5, 2014

(51) Int. Cl.
 *A63B 69/00* (2006.01)
 *G09B 19/00* (2006.01)

(52) U.S. Cl.
 CPC .................... *G09B 19/0076* (2013.01)

(58) Field of Classification Search
 USPC ......................................................... 434/247
 See application file for complete search history.

(56) References Cited

U.S. PATENT DOCUMENTS

| | | |
|---|---|---|
| 5,285,540 A | 2/1994 | Putz |
| 5,287,740 A | 2/1994 | Tomita |
| 5,573,407 A | 11/1996 | Dunford |
| 6,250,929 B1 | 6/2001 | Kolb et al. |
| 7,411,511 B2 | 8/2008 | Kennish et al. |
| 7,756,926 B2 | 7/2010 | Tseng et al. |
| 7,770,783 B2 | 8/2010 | Grant et al. |
| 7,973,210 B2 | 7/2011 | Long et al. |
| 8,261,972 B2 | 9/2012 | Ziegler |
| 2003/0054326 A1 | 3/2003 | Aaron-Barrada |
| 2007/0033059 A1 | 2/2007 | Adkins |
| 2007/0159522 A1 | 7/2007 | Neven |
| 2007/0182826 A1 | 8/2007 | Miller et al. |
| 2008/0026716 A1 | 1/2008 | Billmaier et al. |
| 2009/0108057 A1 | 4/2009 | Mu et al. |
| 2010/0318407 A1 | 12/2010 | Leff et al. |
| 2011/0036915 A1 | 2/2011 | Hamilton |
| 2011/0154174 A1 | 6/2011 | Liu et al. |
| 2011/0183710 A1 | 7/2011 | Selva |
| 2011/0183712 A1 | 7/2011 | Eckstein et al. |
| 2011/0258031 A1 | 10/2011 | Valin et al. |
| 2011/0264527 A1 | 10/2011 | Fitzpatrick et al. |

(Continued)

FOREIGN PATENT DOCUMENTS

| | | |
|---|---|---|
| AU | 2012100308 A4 | 4/2012 |
| EP | 2270768 A1 | 5/2011 |
| JP | 2006309287 | 11/2006 |

(Continued)

*Primary Examiner* — Kesha Frisby
(74) *Attorney, Agent, or Firm* — Armstrong Teasdale LLP

(57) ABSTRACT

Systems and methods for managing toilet training of a person are provided. In one aspect, a method for managing toilet training of a person is provided. The method includes packaging a toilet training product within a container. The method also includes enclosing a post-sale image within the container. The post-sale image is configured to enable a set of enhanced functionality within a user computing device. The set of enhanced functionality is configured to track and record toilet training milestones achieved by the person.

21 Claims, 15 Drawing Sheets

(56) References Cited

U.S. PATENT DOCUMENTS

2012/0237919 A1 9/2012 Kelly
2012/0322041 A1* 12/2012 Weisman .................. 434/308

FOREIGN PATENT DOCUMENTS

| WO | 2009143564 A1 | 12/2009 |
| WO | 2010059546 A1 | 5/2010 |

* cited by examiner

SYSTEMS AND METHODS FOR USING IMAGES TO GENERATE DIGITAL INTERACTION

BACKGROUND

The field of the present invention relates generally to a package having an image associated therewith that is used to generate digital interaction and, more particularly, to a system and method for using images to generate digital interaction that includes a user computing device having a toilet training management application configured to recognize images and deliver augmented reality experiences to a child during the toilet training process.

Toilet training a child is a process conducted over weeks or months, and often involves many manual efforts involving both the parent and the child. When a child is physically ready for toilet training, the parent helps the child through the process of learning to control their bladder and bowel. Although a child may be physically ready to toilet train, the child may not be mentally enthusiastic about performing the recommended toilet training steps. To help the child through the process, a parent will often employ helpful techniques. Known techniques during toilet training include: ritualistic behavioral routine such as having the child sit on the toilet at regular intervals; positive reinforcement such as rewarding the child with a treat or praising the child after a particular achievement; and negative reinforcement such as scolding the child if the child is not willing to participate in some way.

One known problem with the toilet training process is a lack of willingness on the part of the child to participate in the necessary training events and rituals. For example, as a part of the training process, a parent may have the child sit on a toilet at various times during the day. This step both helps the child become acclimated to sitting on the toilet, as well as positioning the child for a potential event. If the child is resistant to this step, then the parent may try to coax the child with a promise of a reward. Or, the parent may give the child a book to occupy the child while sitting on the toilet so that the child will remain seated longer. But these techniques are often limited in their usefulness. Children can quickly tire of sitting on the toilet with just a book, or just a promise.

Another known problem with the toilet training process is parental unfamiliarity with techniques to assist with the process. A new parent may not know when to start a child toilet training, what steps can help in the process, how to engage the child with the process, or how to deal with a child who is uncooperative or disinterested in the process.

Thus, there is a need for a system that can both assist the parent with the toilet training process, as well as motivate the child to participate more readily in the toilet training process, inspire completion of milestones, and provide more compelling entertainment while engaging in the process.

BRIEF DESCRIPTION OF THE DISCLOSURE

In one aspect, a method for managing toilet training of a person is provided. The method includes packaging a toilet training product within a container. The method also includes enclosing a post-sale image within the container, wherein the post-sale image is configured to enable a first set of enhanced functionality within a user computing device, and wherein the first set of enhanced functionality is configured to track and record toilet training milestones achieved by the person.

In another aspect, a computer-readable storage media having computer-executable instructions embodied thereon is provided. The computer-executable instructions, when executed by at least one processor, cause the processor to provide a base set of functionality configured in an enabled status. The computer-executable instructions also cause the processor to provide a first set of enhanced functionality configured in a disabled status, wherein the first set of enhanced functionality is configured to track and record toilet training milestones achieved by a person. The computer-executable instructions further cause the processor to capture a post-sale image using a camera device in communication with the processor, the post-sale image associated with a toilet training product. The computer-executable instructions also cause the processor to recognize the post-sale image upon capturing the post-sale image. The computer-executable instructions further cause the processor to reconfigure the first set of enhanced functionality to an enabled status based at least in part on recognizing the post-sale image.

In yet another aspect, a system for managing toilet training of a person is provided. The system includes a toilet training product comprising a container. The system also includes a post-sale image enclosed inside the container, wherein the post-sale image is configured to enable a processor in communication with a camera device to capture the post-sale image using the camera device, recognize the post-sale image upon capturing the post-sale image, and enable a first set of enhanced functionality based at least in part on recognizing the post-sale image.

In yet another aspect, a computer system for managing toilet training a person is provided. The computer system includes a memory device, a display device, and a processor in communication with the memory device and the display device. The processor is programmed to provide a first set of enhanced functionality configured in an enabled status, wherein the first set of enhanced functionality is accessible using the display device. The processor is also programmed to provide a second set of enhanced functionality configured in a disabled status. The processor is further programmed to utilize at least a portion of the first set of enhanced functionality to identify completion of a toilet training milestone. The processor is also programmed to reconfigure the second set of enhanced functionality to an enabled status based at least in part on identifying completion of the toilet training milestone.

In yet another aspect, a computer-based method for managing toilet training a person is provided. The method is performed using a processor in communication with a camera device and a display device. The method includes programming the processor to perform a first set of enhanced functionality, wherein the first set of enhanced functionality is accessible using the display device, and wherein the first set of enhanced functionality is configured in an enabled status. The method also includes programming the processor to perform a second set of enhanced functionality, wherein the second set of enhanced functionality is configured in a disabled status. The method further includes utilizing at least a portion of the first set of enhanced functionality to identify completion of a toilet training milestone. The method also includes reconfiguring the second set of enhanced functionality to an enabled status based at least in part on identifying completion of the toilet training milestone.

In yet another aspect, a computer-readable storage media having computer-executable instructions embodied thereon is provided. The computer-executable instructions, when executed by at least one processor, cause the processor to provide a first set of enhanced functionality configured in an enabled status, wherein the first set of enhanced functionality is accessible using a display device in communication with the processor. The computer-executable instructions also cause the processor to provide a second set of enhanced functionality configured in a disabled status. The computer-executable instructions further cause the processor to utilize at least a portion of the first set of enhanced functionality to identify completion of a toilet training milestone using the first set of enhanced functionality. The computer-executable instructions also cause the processor to reconfigure the second set of enhanced functionality to an enabled status based at least in part on identifying completion of the toilet training milestone.

DETAILED DESCRIPTION OF THE DISCLOSURE

Figure 1:
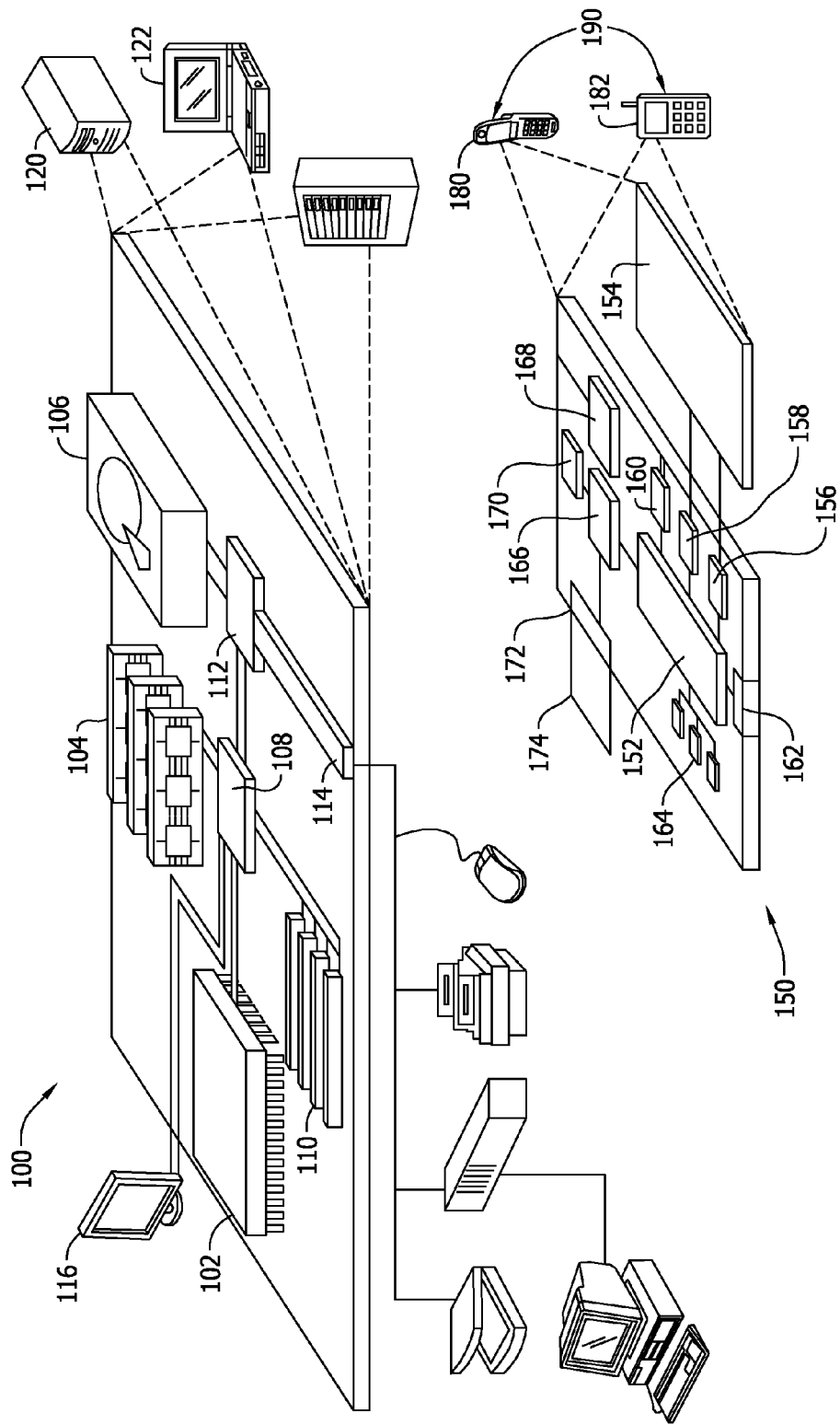
FIG. 1 is a block diagram of example computing systems for managing the toilet training process of a child in accordance with one embodiment of the present disclosure.

Embodiments of the systems and methods described herein include a toilet training management system that assists an adult, such as a parent, in toilet training a person, such as a child of the parent. More specifically, the system includes a toilet training management application ("TTM app") operating on a user computing device, often a "smartphone" or computer tablet. The parent downloads the TTM app to their user computing device. The TTM app includes a suite of functionality (the "base set of functionality") that encourages the parent to begin the toilet training process with their child, and is configured to help both the parent and the child achieve their goals. This base set of functionality includes numerous tools helpful with toilet training the child, including at least one of: games, photos, videos, songs, music, simulated phone calls, training tips, training articles, augmented reality content, simulated training characters, and a portal to online training content. As explained below, upon the initial download of the TTM app, only the base set of functionality is initially enabled for the parent to use. The TTM App includes additional functionality that is unlocked later, after purchase.

In the retail store, the parent is able to use the augmented reality ("AR") function of the TTM app with the child. The AR experience is initiated by the parent or child using the TTM app and the user computing device's camera to capture a logo image displayed at the point of sale of a toilet training product. For example, the logo image may be displayed in a store near toilet training underpants, or in other commercial or advertising settings such that the logo image can be easily captured by the TTM app and the user computing device's camera. Capturing the logo image causes the user computing device to execute and display a first AR experience for the parent and the child. The first AR experience can be an exhibition of the system, so that the parent and the child can see how the system will work. After viewing the first AR experience, the parent purchases the toilet training product and begins the toilet training process with the child.

After purchasing the toilet training product (e.g., toilet training underpants), the parent is able to unlock additional functionality within the TTM app (the "first set of enhanced functionality"). As explained below, the first set of enhanced functionality is initially downloaded with the TTM app but not yet enabled for the user's use. Inside the product packaging, the parent finds another image (the "post-sale image") configured to interact with the user computing device and the TTM app. The parent captures the post-sale image using the TTM app and the user computing device's camera, thereby unlocking the first set of enhanced functionality included with the suite of functionality within the TTM app. This first set of enhanced functionality includes at least one of: a rewards system, games, photos, videos, songs, music, simulated phone calls, story books, augmented reality content, and simulated training characters.

The post-sale image comes in the form of a sticker that can be displayed near the toilet, or stuck to the toilet, or perhaps carried around with the parent for use outside the home. After a successful toilet training event, the parent and the child capture the post-sale image. The TTM app is configured to display AR content upon capturing the post-sale image.

Additionally, the TTM app includes a rewards system for incentivizing the child's participation in the toilet training process. As the child participates successfully in toilet training events, the child scans the post-sale image and achieves a "star." These "stars" track progress toward toilet training milestones. Once the child has achieved enough "stars", the TTM app will automatically enable additional functionality for the child within the TTM app (the "second set of enhanced functionality"). This second set of enhanced functionality includes extra functionality such as at least one of: additional games, photos, videos, songs, music, simulated phone calls, story books, and/or other AR experiences.

The TTM app is designed to be used both by the parent and the child during the toilet training process. For the parent, the TTM app can help educate the parent by providing tips and tricks for a successful toilet training process. For the child, the TTM app can help with reminding the child when to use the toilet, entertaining the child when using the toilet, which prolongs the child's time on the toilet, and rewarding the child after successfully using the toilet or achieving a milestone. The TTM app contains a rewards system tied to achieving toilet training milestones, such as, without limitation, successfully spending time on the toilet, a successful bowel or bladder evacuation event, or washing hands after an event. Toilet training milestones may also include any tasks, behaviors, or steps that are developed in the child as part of the toilet training process, such as, without limitation, learning the ability to follow simple routines, or learning skills to be independent in the bathroom. In other words, toilet training milestones include tasks or behaviors that are needed by the child in order to complete the overall toilet training process. Because the toilet training process involves different challenges for different parents and children, the toilet training milestones may be tailored by the parent specifically for a particular child's situation and circumstances. For example, without limitation, if a child resists wearing a training diaper instead of his current diaper, the parent may use that event as a toilet training milestone, i.e., when the child agrees to wear the training diaper, then he has achieves a toilet training milestone. Thus, a toilet training milestone may include events that are defined by the parent for a particular child. For each milestone the child achieves, they are rewarded with a "star". Upon accumulation of a certain number of stars, the TTM app opens up special digital content for the child.

The following detailed description illustrates embodiments of the invention by way of example and not by way of limitation. It is contemplated that the invention has general application to enabling application functionality through the use of scanning an in-package image after sale, and to incentivizing achievement of milestones, regardless of the particular performance objective.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

As used herein, the phrase "augmented reality" generally refers to capturing a real-world image using a camera and to render the real-world image using a display device, as well as including additional content, such as sound, images and video, along with the real-world image. As used herein, "augmented reality functionality" refers to the set of instructions required to provide augmented reality content. As used herein, "augmented reality content" refers to the sound, images and/or video rendered in conjunction with the real-world image. It is understood that augmented reality functionality can operate either with still real-world images, such as digital photographs, or with continuous real-world images, such as digital video. Also as used herein, "augmented reality experience" or "AR experience" refers to the visual or auditory experience that a user has when viewing or hearing the augmented reality content.

The systems and methods described herein may be implemented using computer programming or engineering techniques including computer software, firmware, hardware, or any combination or subset thereof, wherein the technical effects may be achieved by performing at least one of the following steps: (a) packaging a toilet training product within a container; (b) enclosing a post-sale image inside the container; (c) providing a user computing device, wherein the user computing device includes a processor coupled to a memory, a display device, and a camera device; (d) providing a base set of functionality within the user computing device, wherein the base set of functionality is configured in an enabled status and, further, enables the capturing of images; (e) providing a first set of enhanced functionality within the user computing device, the first set of enhanced functionality is configured in a disabled status when initially downloaded to the user computing device; (e) capturing the post-sale image using the camera device; (f) utilizing at least a portion of the base set of functionality to recognize the post-sale image upon capturing the post-sale image; (g) reconfiguring the first set of enhanced functionality to an enabled status upon recognizing the post-sale image; (h) providing a second set of enhanced functionality; (i) utilizing the first set of enhanced functionality to identify completion of a toilet training milestone; and (j) reconfiguring the second set of enhanced functionality to an enabled status upon identifying completion of the toilet training milestone.

FIG. 1 is a block diagram showing example computing devices and associated elements that may be used to implement the systems and methods described herein. FIG. 1 shows an example of a generic computing device 100 and a generic mobile computing device 150, which may be used with the techniques described here. The computing device 100 is intended to represent various forms of digital computers, such as laptops, desktops, workstations, personal digital assistants, servers, blade servers, mainframes, and other appropriate computers. The computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

The computing device 100 includes a processor 102, memory 104, a storage device 106, a high-speed interface or controller 108 connecting to memory 104 and high-speed expansion ports 110, and a low-speed interface or controller 112 connecting to low-speed bus 114 and storage device 106. Each of the components 102, 104, 106, 108, 110, and 112, are interconnected using various buses, and may be mounted on a common motherboard or in other manners as appropriate. The processor 102 can process instructions for execution within the computing device 100, including instructions stored in the memory 104 or on the storage device 106 to display graphical information for a Graphical User Interface ("GUI") on an external input/output device, such as display 116 coupled to high-speed controller 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system).

The memory 104 stores information within the computing device 100. In one implementation, the memory 104 is a volatile memory unit or units. In another implementation, the memory 104 is a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high-speed controller 108 manages bandwidth-intensive operations for the computing device 100, while the low-speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed bus 114. The low-speed bus 114, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, an input/output device such as a display 154, a communication interface 166, and a transceiver 168, among other components. The device 150 may also be provided with a storage device, such as a microdrive or other device, to provide additional storage. Each of the components 150, 152, 164, 154, 166, 168, and 190 are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and user interface 156 coupled to a display 154. The display 154 may be, for example, a TFT LCD (Thin-Film-Transistor Liquid Crystal Display) or an OLED (Organic Light Emitting Diode) display, or other appropriate display technology. The user interface 156 may comprise appropriate circuitry for driving the display 154 to present graphical and other information to a user. The control interface 158 may receive commands from a user and convert them for submission to the processor 152. In addition, an external interface 162 may be provided in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may also include secure information. Thus, for example, expansion memory 174 may be provided as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152, that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, Wi-Fi, or other such transceiver (not shown). In addition, GPS (Global Positioning system) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

Device 150 includes a digital camera 190. The digital camera 190 may capture real-world images in either still-image or full-motion video. The digital camera 190 may store images or video in memory 164 or expansion memory 174. The digital camera 190 may also display images or video directly to user interface 156. Captured images or video may be accessed by processor 152 for image processing.

The computing device 150 may be implemented in a number of different forms, as shown in the figure. For example, it may be implemented as a cellular telephone 180. It may also be implemented as part of a smart phone 182, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device (e.g., computing device 100 and/or 150) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

In the example embodiment, the TTM app may be stored on the computing device 100 and downloaded to computing device 150. Computing device 150 is configured to process the TTM app, receive data inputted by a user, execute functionality included within the TTM app, and output results based on inputted data and the functionality of the TTM app.

As illustrated in FIG. 1, computing devices 100 and 150 are configured to receive and/or retrieve electronic documents from various other computing devices connected to computing devices 100 and 150 through a communication network, and store these electronic documents within at least one of memory 104, storage device 106, and memory 164. Computing devices 100 and 150 are further configured to manage and organize these electronic documents within at least one of memory 104, storage device 106, and memory 164 using the techniques described herein.

Figure 2:
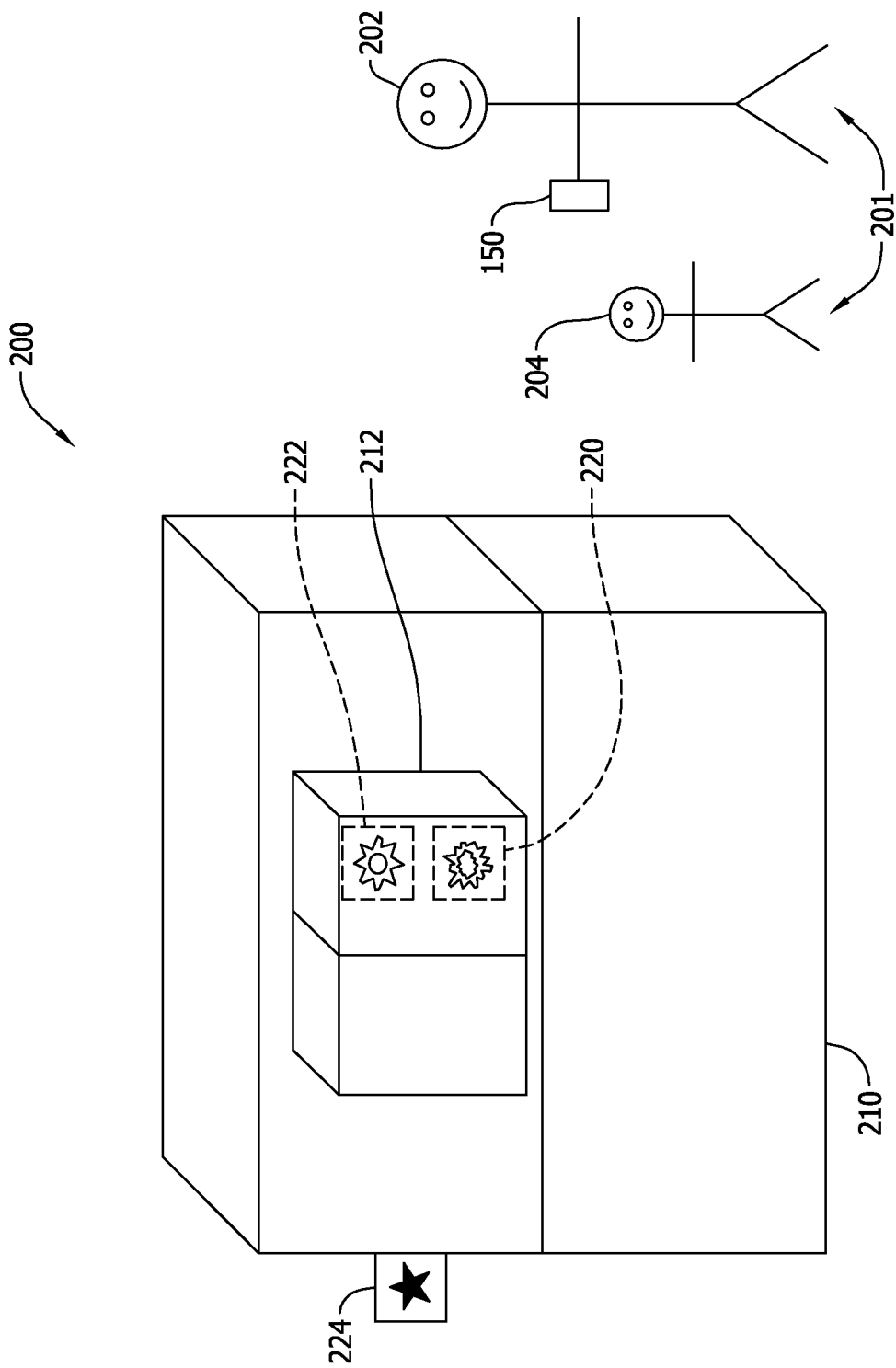
FIG. 2 is a diagram of an example retail setting in which a user encounters toilet training products for sale having images that are used in combination with the computing systems shown in FIG. 1.

FIG. 2 is a diagram of an example retail setting 200 in which a user 201 encounters toilet training products for sale. In the retail setting 200, a parent 202 and a child 204 approach a shelving display 210 to investigate toilet training products such as toilet training diapers or undergarments. The parent 202 has with her the mobile computing device 150. It is understood that the parent 202 and/or the child 204 represents users 201 of the mobile computing device 150. It is further understood that other products may be used with the systems and method described herein.

The illustrated shelving display 210 contains a product container 212, which has a first image 220 (the "post-sale image") enclosed inside. The first image 220 is enclosed inside the product container 212 in such a way that the image 220 is not visible to shoppers without opening the product container 212. It should be understood, however, that lack of visibility of the image is not essential to the operation of the systems and methods described herein. In some embodiments, first image 220 may appear on a sticker or card enclosed within container 212. In other embodiments, first image 220 may appear on the product that is inside the container 212, such as, without limitation, printing first image 220 upon a toilet training pant that is packaged within container 212. In still other embodiments, first image 220 may include a pin code. In operation, opening of the product container 212 occurs after the parent 202 purchases a toilet training product. The functional aspects of first image 220 are discussed below.

As illustrated in FIG. 2, a second image 224 is present in the retail setting 200. The second image 224 (the "logo image") is visible to shoppers without opening the product container 212. In some embodiments, the second image 224 may be a part of a product display, for example, without limitation, attached to the shelving display 210 near the product container 212, or as a part of a separate display (not shown). In other embodiments, second image 224 may appear on the outside of the product container 212, or may be accessible to the public through other media outlets such as, without limitation, the internet, television commercials, other retail settings, and other advertisement settings. In still other embodiments, first image 220, and/or second image 224 may be a branded icon that consumers come to associate with a product or a company. In still other embodiments, additional images may be provided within the product container 212 or at the retail setting 200, or accessible to the public through any of the venues mentioned above, and may enable functionality or display augmented reality content similar to the example systems and methods discussed in this disclosure.

In the illustrated embodiment, the second image 224 is accessed by the user 201 using the mobile computing device 150. In operation, the user 201 downloads and installs a Toilet Training Management app ("TTM app") (not shown in FIG. 2) prior to arriving at the retail setting 200. The TTM app is programmed to capture and recognize the second image 224 through the use of the mobile computing device's 150 digital camera 190. Upon recognizing the second image 224, the TTM app displays an augmented reality ("AR") experience using the mobile computing device's 150 user interface 156. Alternatively, or additionally, the second image 224 may contain a Quick Response ("QR") code (not shown). If the user has not yet downloaded and installed the TTM app, the user 201 may scan the QR code with the mobile computing device 150 and be directed to an informational internet site, from which the user 201 may download the TTM app.

In the illustrated embodiment, the AR experience generated by capturing the second image 224 prompts the user 201 to select a favorite character from a list of characters. The TTM app then displays an animation involving the selected character, as well as gives the user 201 an opportunity to have a photo taken with the selected character using the digital camera 190 and AR functionality.

Figure 3:
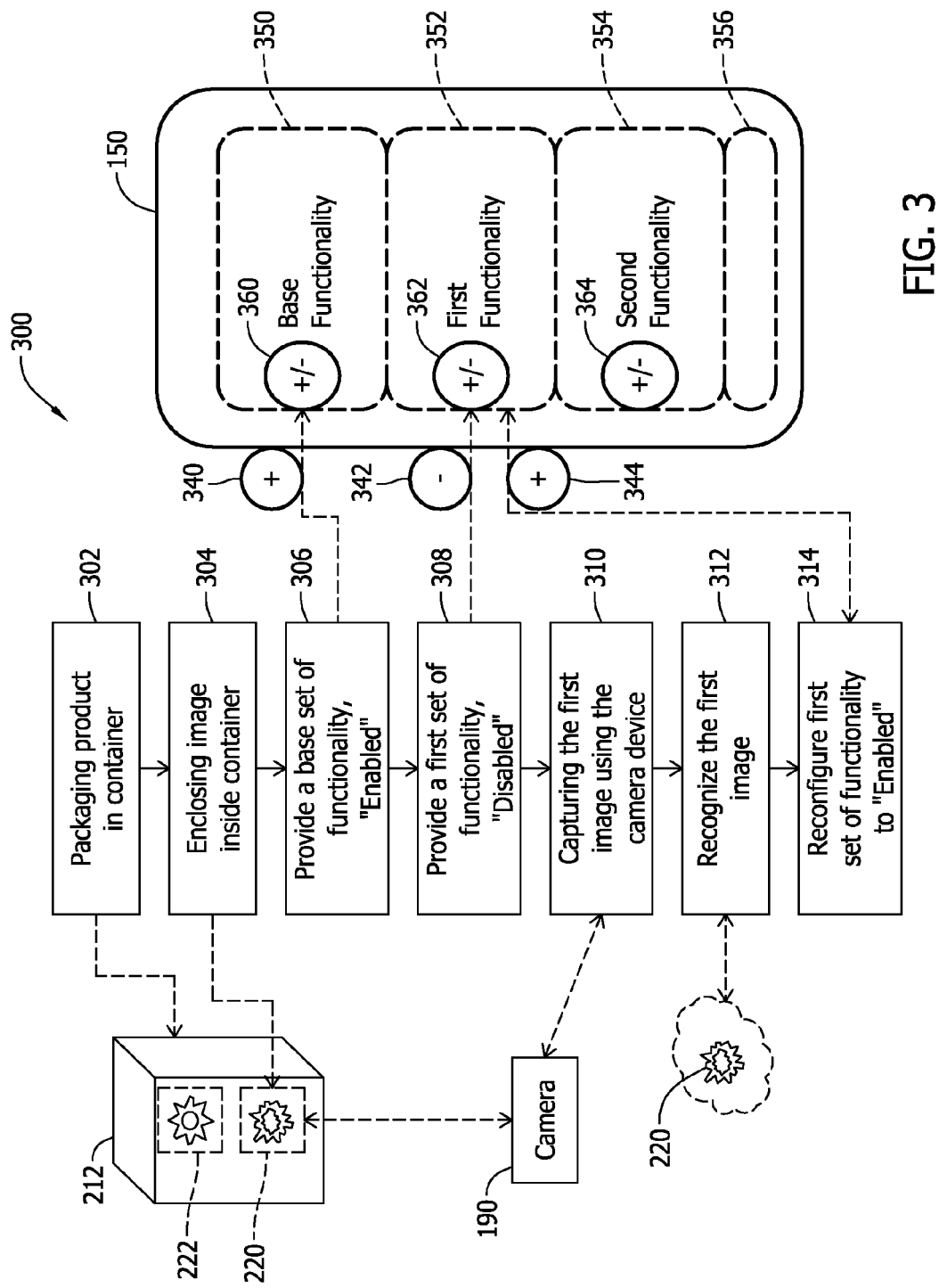
FIG. 3 is a flow chart of an example method for managing the toilet training process of a person using the computing devices in FIG. 1 and the images shown in FIG. 2.

FIG. 3 is a flow chart of an example method 300 for managing the toilet training process of a child 204, 201 (shown in FIG. 2). In the example embodiment, the method 300 involves using the mobile computing device 150 and the TTM app (not separately shown). In some embodiments, the mobile computing device 150 is a smartphone or tablet computer upon which the user 201 has downloaded and installed the TTM app. The TTM app includes sets of "functionality". As used herein, the terms "functionality", "set of functionality", and "function" are intended to refer to a set of computer-implemented instructions that, when executed by the mobile computing device 150, cause the computing device 150 to perform one or more operations. For example, and without limitation, a set of instructions that allows the user 201 to listen to music may be described as "a functionality" or "a function". Additionally, the term "functionality" and "set of functionality" may refer to an individual function or to a set of functions.

In the illustrated embodiment, the mobile device 150 and the TTM app include a base functionality 350, a first set of enhanced functionality 352, and a second set of enhanced functionality 354. In some embodiments, these sets of functionality are provided as portions of a single software application. After installation of the TTM app, the base functionality 350 allows an initial set of functions relative to toilet training such as, without limitation, product information, product advertisements, games, photos, videos, songs, music, a rewards system, simulated phone calls, training tips, training articles, story books, simulated training characters, persistent progress tracking, a portal to online training content, AR functionality, AR content, and image capture. It should be understood, however, that additional functionality necessary to implement the systems and methods described herein, such as, without limitation, displaying augmented reality content, and capturing real-world images, may also be included, without limitation, in the base functionality 350, the first set of enhanced functionality 352, the second set of enhanced functionality 354, the other set of enhanced functionality 356, or in any other way which allows the operation of the systems and methods as described herein. It should also be understood that other embodiments may provide only limited functionality in the base functionality 350, shifting more functionality to one of the "enhanced" functionality levels. It is also understood that the functionalities described herein need not be related to toilet training.

As illustrated in FIG. 3, each of the functionalities shown include an enablement status 360, 362 and 364, which is configured in either an enabled ("+") or a disabled ("−") state. In operation, the user 201 can only access a particular functionality if that particular functionality's enablement status is "enabled". It is understood that "enablement status" is merely a term of logical construction, and not an element of physical structure. It should be understood that status enablement and disablement of functionality may be provided in any way which allows the operation of the systems and methods described herein. It should be understood that enablement status 360, 362, 364 defaults to "enabled" unless otherwise specified.

As illustrated in FIG. 3, the method 300 involves packaging 302 a toilet training product (not separately shown) within the product container 212. It should be understood, however, that the product need not be a toilet training product. The first image 220 (the "post-sale image") is enclosed 304 inside of the product container 212.

Further, as illustrated in FIG. 3, the base functionality 350 is provided 306 in an enabled status 340. The first set of enhanced functionality 352 is also provided 308, but in a disabled status 342. As used herein, the term "provides", as it refers to functionality, generally refers to making the functionality present within the mobile computing device 150, but not necessarily configured in such a way as to be immediately usable by the user 201. For example, and without limitation, music playing functionality is "provided" if the set of instructions which allows the playing of music is given to the mobile computing device 150, whether or not the music playing functionality is in an enable or a disabled state. However, the "provided" functionality only becomes accessible to the user 201 once it is enabled. In operation, the base functionality 350, the first set of enhanced functionality 352, and the second set of enhanced functionality 354 are all "provided" upon installation of the TTM app. However, only the base functionality is initially "enabled".

In the example embodiment, enablement status 362 and 364 are utilized for the first set of enhanced functionality 352 and the second set of enhanced functionality 354. It should be understood, however, that the base functionality 350 may or may not include enablement status 360. The base functionality 350 may be "enabled" without need for a logical switch to enable or disable it. It should also be understood that other sets of enhanced functionality 356 similar to the base functionality 350 and the first set of enhanced functionality 352 may also be included, and may also utilize an enablement status mechanism similar to enablement status 362.

Moreover, as illustrated in FIG. 3, the first image 220 is captured 310 using the digital camera 190 (shown in FIG. 1). As used herein, the term "capture" involves the use of the mobile computing device 150 coupled to the digital camera 190, herein alternately referred to as "camera" or "camera device". "Capturing" an "image" generally involves the digital camera 190 processing a digitization of the real-world image, such as, without limitation, taking a digital photograph or a video of the "image". In operation, the parent 202, 201 would purchase the toilet training product from retail setting 200 (shown in FIG. 2), take the product home with her, and open the product container 212 to find the first image 220 enclosed inside. With the mobile computing device 150 configured with the TTM app, the parent 202, 201 would then capture 310 the first image 220.

In the illustrated embodiment, upon capturing 310 the first image 220, the first image 220 is then recognized 312 by the computing device 150. As used herein, "recognizing" an "image" involves the processor 102, 152 utilizing any method of identifying the presence of the "image". In some embodiments, recognizing 312 an image utilizes a method of comparing the captured 310 image to a model image (not shown), such as, without limitation, the methods commonly available in the field of image recognition and image processing. In some embodiments, recognizing 312 an image relies on image shape, color, and/or orientation. In some embodiments, the images are designed to assist and/or enable the image recognition 312 process. It should be understood that any image recognition technique that enables operation of the systems and methods as described herein may be used.

In the illustrated embodiment, upon recognizing 312 the first image 220 (the "post-sale image"), the first set of enhanced functionality 352 is reconfigured 314 to enabled status 344. In operation, this step opens up greater application functionality within the TTM app. The first set of enhanced functionality 352 allows additional sets of functions relative to toilet training such as, without limitation, a rewards system, games, photos, videos, songs, music, simulated phone calls, training tips, training articles, persistent progress tracking, AR content, AR functionality, simulated training characters, and story books. In some embodiments, the post-sale image 220 may act as, without limitation, the proof of purchase of a product, thereby providing the purchaser (i.e., user 201) access to the otherwise-disabled content (i.e., the first set of enhanced functionality 352 and/or the second set of enhanced functionality 354). In some embodiments, the TTM app may display augmented reality content after recognizing the post-sale image 220.

Figure 4:
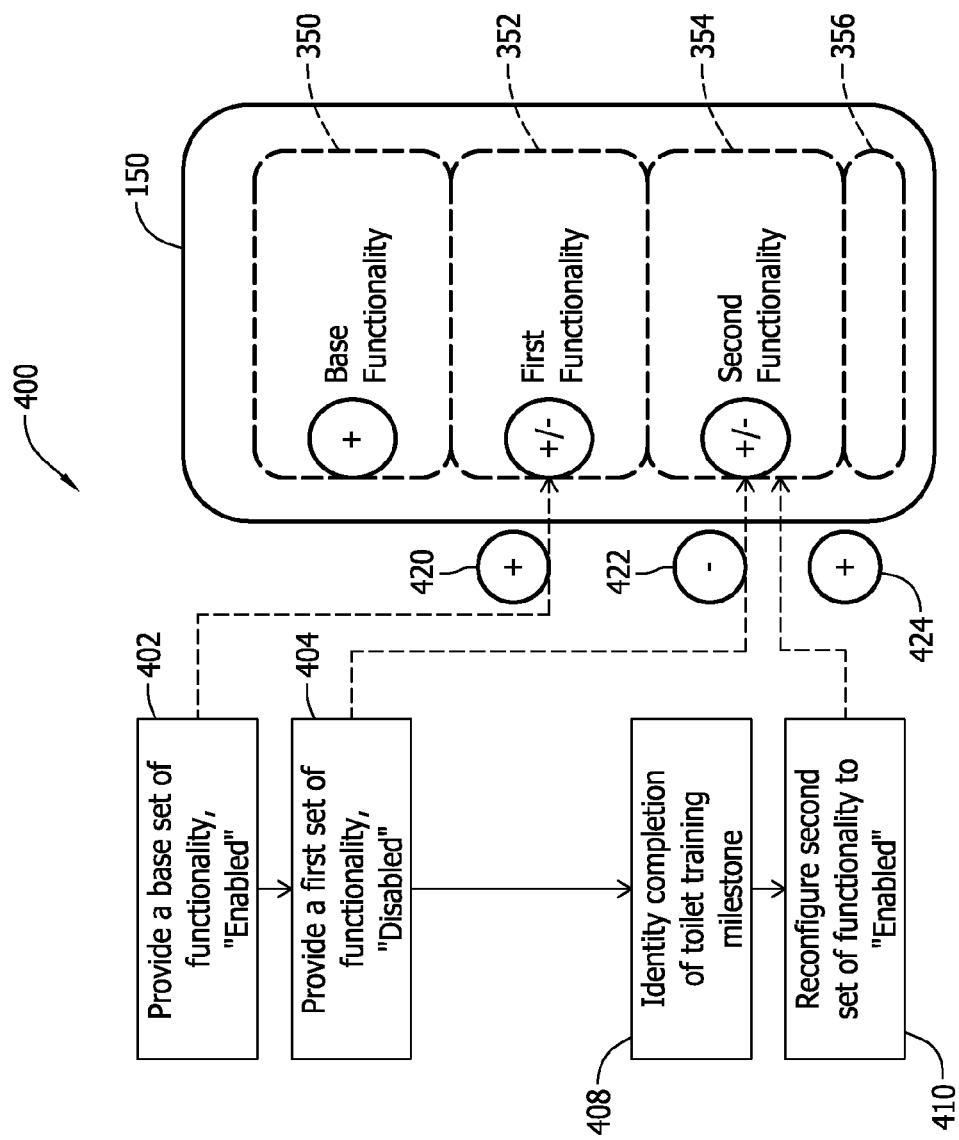
FIG. 4 is a flow chart of another example method for managing the toilet training process of a person using the computing devices in FIG. 1 and the images shown in FIG. 2.

FIG. 4 is a flow chart of another method 400 for managing the toilet training process of a child 204, 201 (shown in FIG. 2) using the mobile computing device 150. As used herein, the term "person" generally refers to the individual being toilet trained, which is most frequently a child. The term "user" generally refers to the individual operating the mobile computing device 150. In the example embodiment, the person being toilet trained (i.e., the child 204) is also a user 201. In other embodiments, there may be multiple users of the mobile computing device 150, such as, without limitation, the parent 202, the child 204, and other adults or children (not shown).

In the example embodiment, the first set of enhanced functionality 352 is provided 402 in an enabled 420 state to the user 201 through the mobile computing device 150. The second set of enhanced functionality 354 is also provided 404, but in a disabled 422 state. In some embodiments, the second set of enhanced functionality 354 includes functionality such as, without limitation, a rewards system, video games, video game content, video game functionality, music, music video content, multimedia content, pictures, videos, story books, persistent progress tracking, augmented reality functionality, and augmented reality content.

As illustrated in FIG. 4, the first set of enhanced functionality 352 is utilized 408 to identify completion of a toilet training milestone (not shown) for the child 204, 201. The second set of enhanced functionality 354 is reconfigured 410 to an enabled state 424 after one of the toilet training milestones is completed within the TTM app and a reward is provided to the user 201. Once the second set of enhanced functionality 354 is reconfigured 410 to the enabled status, it is then available for use by the user 201. It should be understood that milestones other than those related to toilet training may be used.

In the example embodiment, the TTM app includes a reward system to encourage the child's 204, 201 involvement in the toilet training process. In operation, completion of a toilet training milestone enables the second set of enhanced functionality 354 to provide a reward for the child 204, 201. The child 204, 201 is motivated to achieve the milestone in order to enable the second set of enhanced functionality 354.

The parent 202, 201 utilizes 408 the first set of enhanced functionality 352 to identify completion of the toilet training milestone, thus providing the reward for the child 204, 201.

In some embodiments, utilizing 408 the first set of enhanced functionality 352 to identify completion of the milestone involves capturing the first image 220 (the "post-sale image"). The first image 220 is configured to be attached to or attached adjacent to the toilet so that it can easily be captured by the computing device 150 when the child 204, 201 has completed a toilet training event. In other embodiments, first image 220 is on the toilet training product itself. In still other embodiments, first image 220 is attached to a card that the parent 202 and child 204 can take with them when they travel outside the home. The first set of enhanced functionality 352 of the TTM app is configured to capture the first image 220, which causes the computing device 150 to display AR content to the child 204, 201. Thus, the AR content acts as an incentive for the child to engage in the toilet training process.

In some embodiments, one or more of the base functionality 350, the first set of enhanced functionality 352, the second set of enhanced functionality 354, and other sets of enhanced functionality 356 include alerting functionality. In operation, the alerting functionality may be used to alert the parent 202, 201 or the child 204, 201 of an event associated with toilet training, such as, without limitation, reminding the child on a periodic basis that the child should engage in the toilet training process again. In some embodiments, the alerting functionality is based on one of an elapsed time and a scheduled time.

Figure 5:
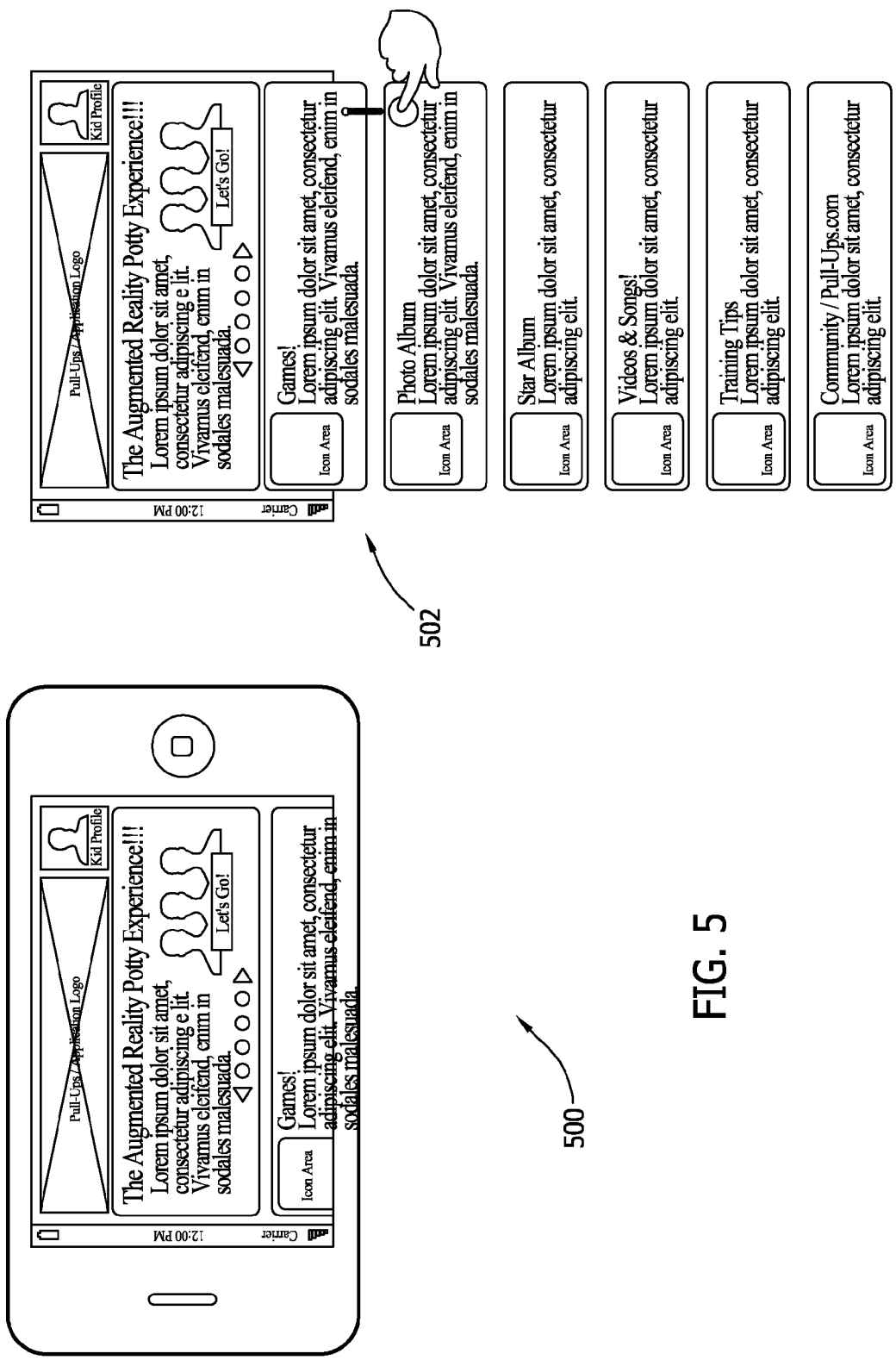
FIG. 5 is a diagram of an example user interface for the home screen of a toilet training management application programmed to execute using the computing devices in FIG. 1 and interact with the images shown in FIG. 2.

FIG. 5 is a diagram of an example user interface 500 displayed on the user computing device 150 (shown in FIG. 1) when operating the TTM app. The user interface 500 shows a home menu 502 through which the user 201 (shown in FIG. 2) accesses enabled functionality. Home menu 502 includes an augmented reality icon, a games icon, a photo album icon, a star board icon, a kid profile icon, a training tips & advice icon, a videos & songs icon, a big kid timer icon, and a character call icon.

Figure 6:
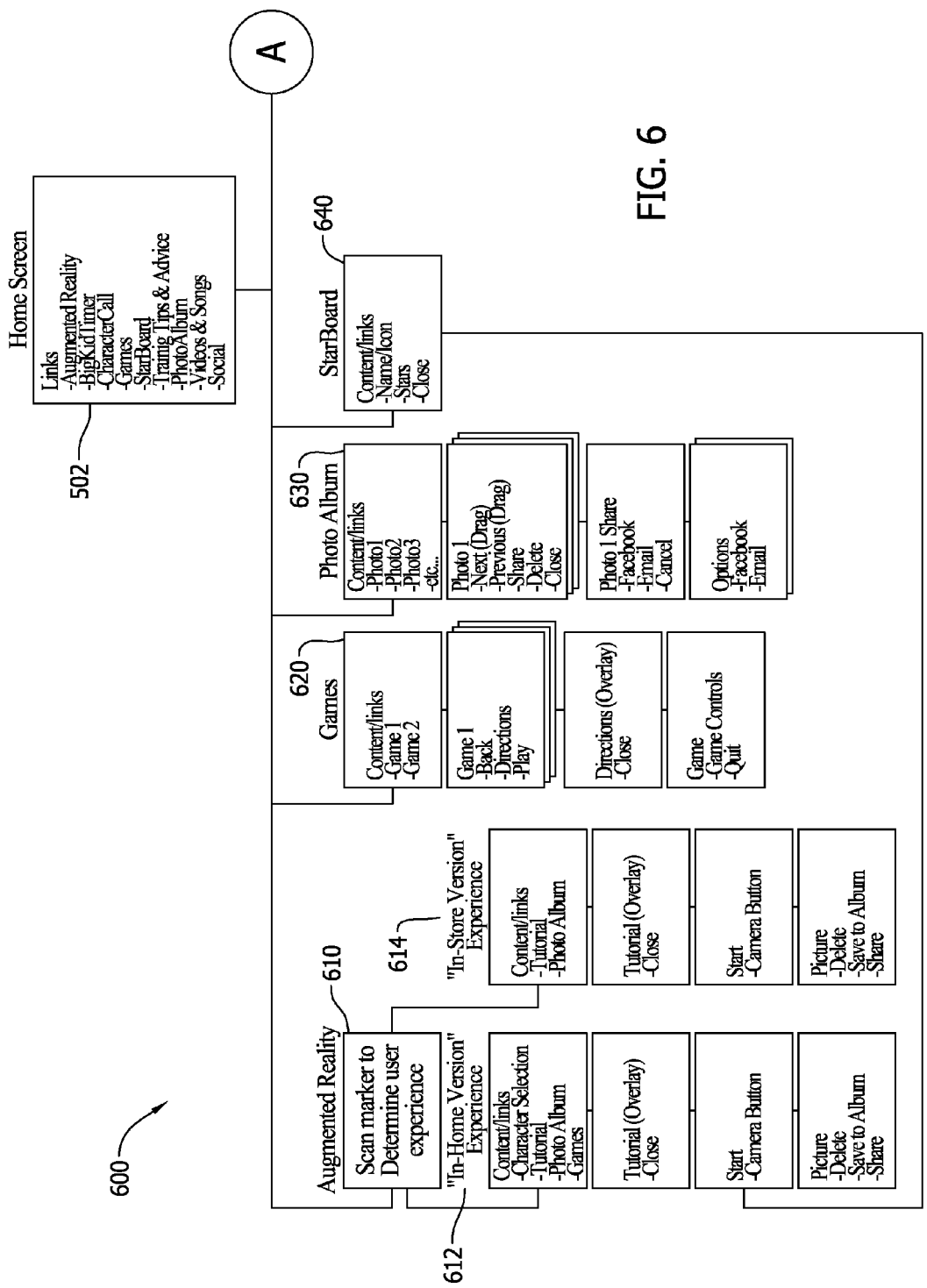
FIG. 6 is a diagram of a portion of an example menu system for the toilet training management application shown in FIG. 5.
Figure 7:
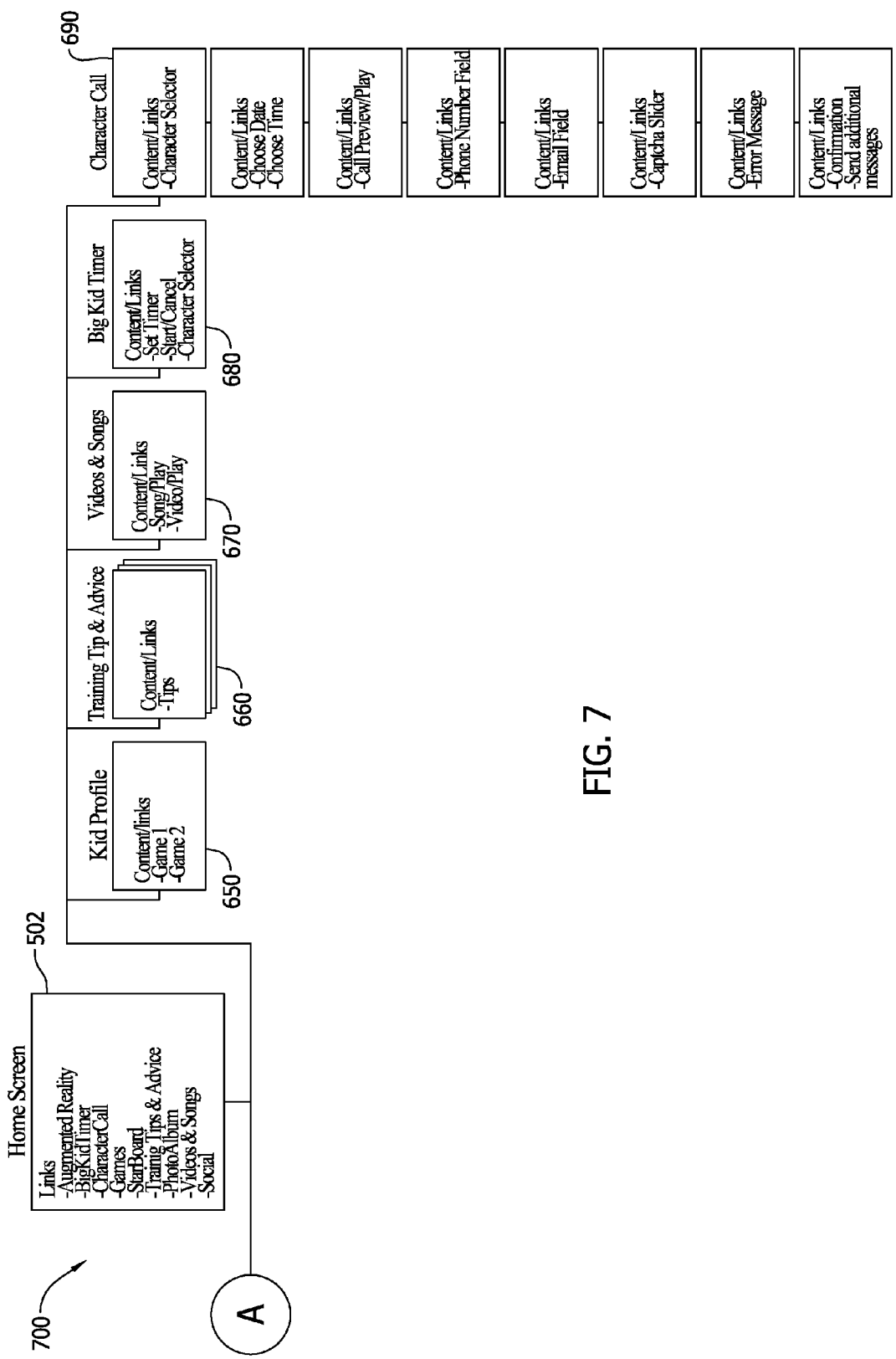
FIG. 7 is a diagram of another portion of an example menu system for the toilet training management application shown in FIG. 5.

FIGS. 6 and 7 show an exemplary menu system for the TTM app shown in FIG. 5. FIG. 6 is a diagram of a portion of an example menu system for the toilet training management application shown in FIG. 5. FIG. 7 is a diagram of another portion of an example menu system for the toilet training management application shown in FIG. 5.

Referring to FIGS. 6 and 7, in the illustrated embodiment, the menu system 600, 700 includes a home menu 502 which represents the root of the menu system 600, 700 for the TTM app. From the home menu 502, the user 201 (shown in FIG. 2) can navigate to: (a) augmented reality submenu 610, (b) games submenu 620, (c) photo album submenu 630, (d) "star board" submenu 640, (e) kid profile submenu 650, (f) training tips and advice submenu 660, (g) videos and songs submenu 670, (h) big kid timer submenu 680, and (i) character call submenu 690.

In operation, in the illustrated embodiment, the augmented reality submenu 610 is utilized for the image capture, augmented reality functionality and content display functions as described herein. The augmented reality submenu 610 comprises an "in-home" experience 612 and an "in-store" experience 614, discussed in greater detail below. The games submenu 620 allows users 201 to access the enabled game functionality. The photo album submenu 630 allows users 201 to view and manage previously-taken photos, and to share the photos via email and social media. The star board submenu 640 allows users 201 to view their current progress. The kid profile submenu 650 allows the creation of new profiles and the editing of existing profiles. The training tips and advice submenu 660 gives the parent 202 access to various training content and tips. The videos and songs submenu 670 allows users 201 to watch videos or listen to songs. The big kid timer submenu 680 allows users 201 to configure alerts. The character call submenu 690 allows the parent 202 to configure a simulated phone call from a favorite animated character. It should be understood that the various features not yet "enabled" by the systems and methods described herein will not be accessible to, and may not even be visible to, the user 201.

Figure 8:
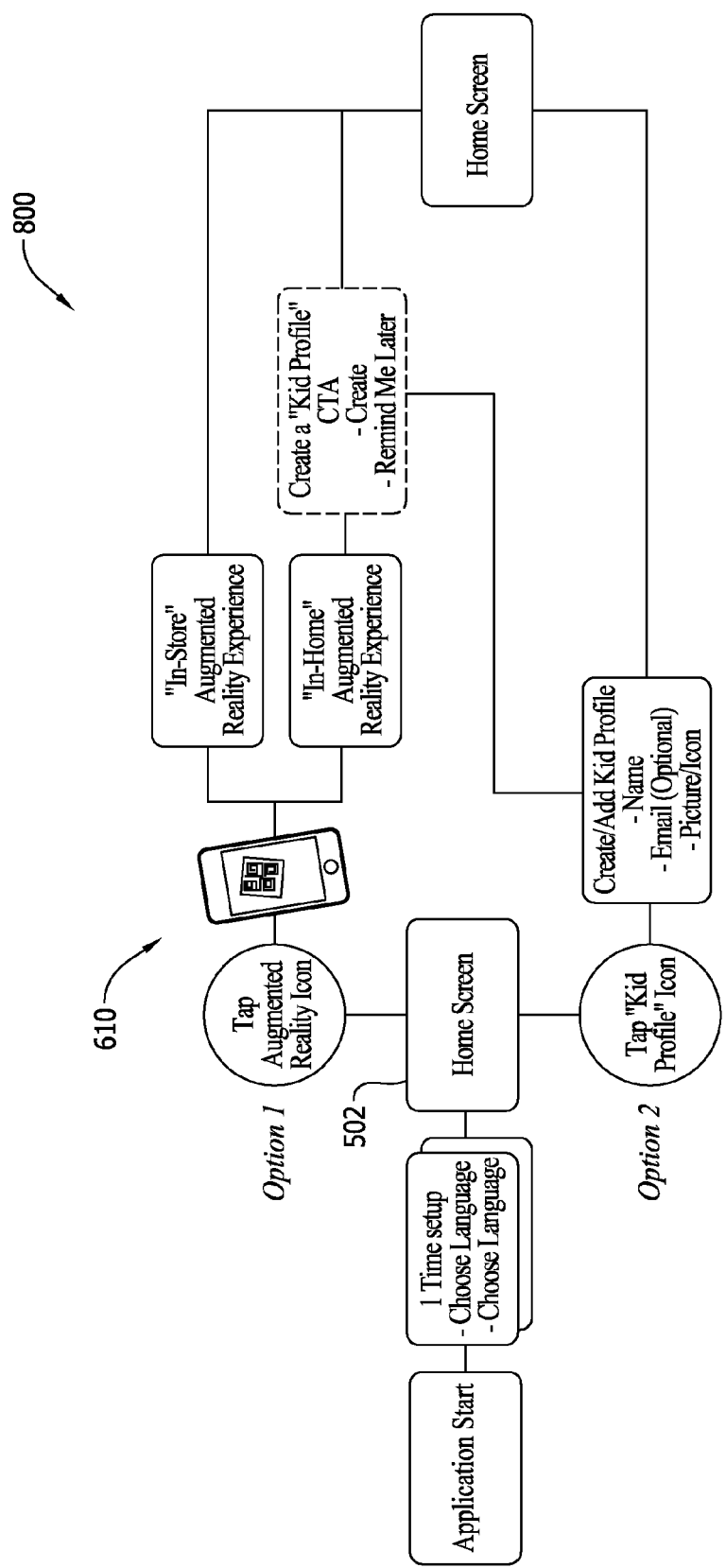
FIG. 8 is a flow chart of a portion of the example toilet training management application shown in FIG. 5 showing initial application configuration and profile setup, as well as base functionality.

FIG. 8 is a flow chart 800 showing initial application configuration and profile setup for the child 204 (shown in FIG. 2) within the TTM app. In operation, upon launching the TTM app for the first time, the user 201 (shown in FIG. 2) is asked to select a language, as well as given the option to create a profile. Once through this process, the TTM app will only have base functionality 350 (shown in FIGS. 3 and 4) enabled. As discussed herein, the base functionality 350 is configured to capture and recognize the first image 220 (the "post-sale image"), which causes the first set of enhanced functionality 352 (shown in FIG. 3) to become enabled 344 (shown in FIG. 3) and ready for use by user 201. The base functionality 350 is also configured to capture and recognize the second image (the "logo image"), which causes information to be displayed to further educate the user with regard to the system.

Figure 9:
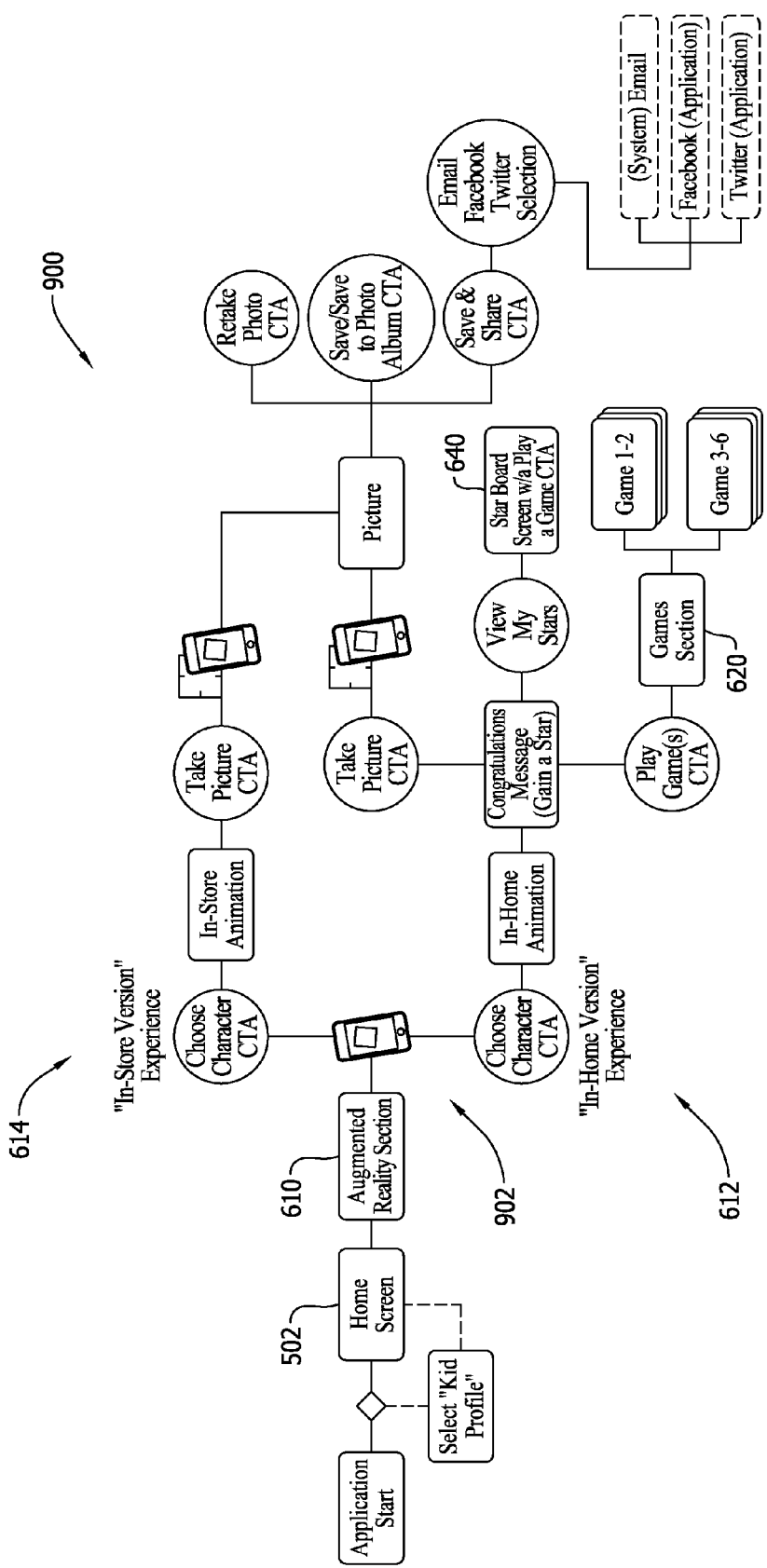
FIG. 9 is a flow chart of a portion of the example toilet training application shown in FIG. 5 showing application flow for an augmented reality functionality.

FIG. 9 is a flow chart 900 showing the augmented reality submenu 610, and a process flow for both the "in-home" experience 612 (shown in FIG. 6) and the "in-store" experience 614 (shown in FIG. 6). In the example embodiment, the user 201 (shown in FIG. 2) engages the "in-store" experience 614 by capturing 902 the second image 224 (shown in FIG. 2) at the retail setting 200 (shown in FIG. 2) using the TTM app. In another embodiment, the user 201 engages the "in-home" experience 612 by first purchasing the toilet training product (not shown in FIG. 9), removing the first image 220 (shown in FIG. 2) from the product container 212 (shown in FIG. 2), and capturing 902 the first image 220 using the TTM app. The computing device 150 and the TTM app are configured to capture and recognize the first image 220, retrieve data from the memory 164 in response to the captured image, and display data on the computing device 150, such as videos, songs, or AR content directed to entertaining and educating a child for the purposes of toilet training the child.

Figure 10:
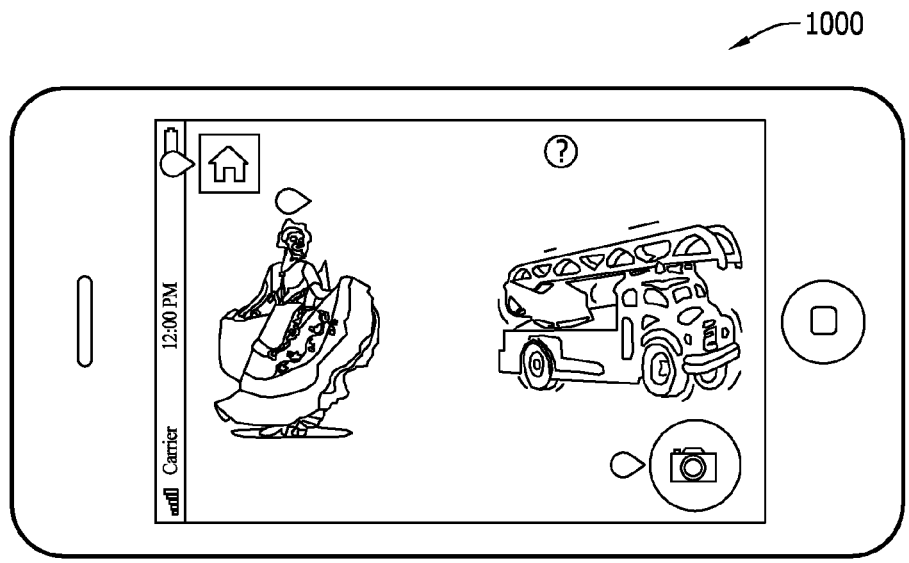
FIG. 10 is a diagram of an example user interface showing a character selection screen accessed through the augmented reality submenu shown in FIG. 6.

FIG. 10 is a diagram of an example user interface 1000 showing a character selection interface that is accessed through the augmented reality submenu 610 (shown in FIG. 6). In operation, the user 201 (shown in FIG. 2) engages the augmented reality functionality by capturing 902 (shown in FIG. 9) an image, as discussed above. The character selection interface 1000 allows the user 201 to customize the AR experience according to the user's 201 own preferences by selecting one character from a pool of options. Following the selection of the character, the selected character will appear throughout the AR experience. In some embodiments, the user 201 may also create and store a photo of the user 201 with the character.

Figure 11:
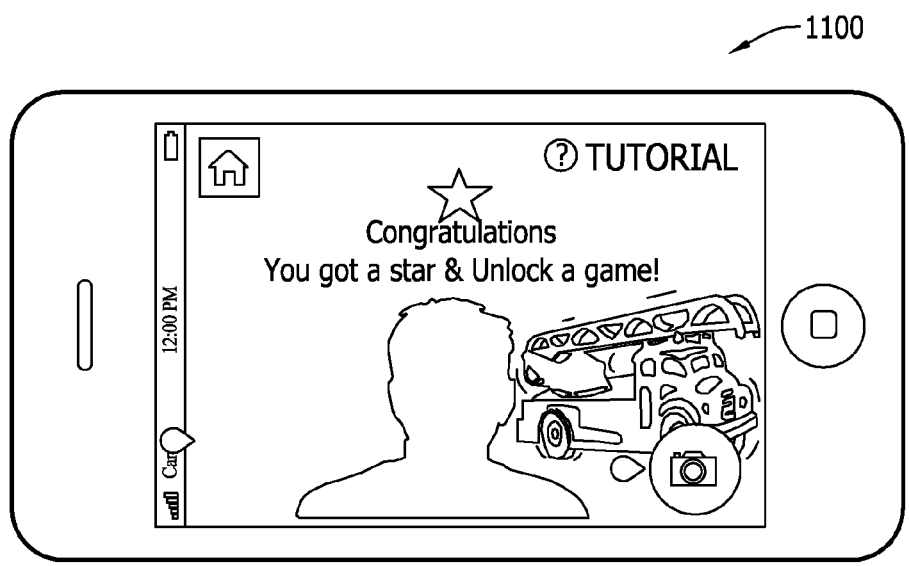
FIG. 11 is a diagram of an example user interface showing an augmented reality completion screen accessed through an augmented reality submenu shown in FIG. 6.

FIG. 11 is a diagram of an example user interface 1100 showing an AR completion screen accessed through the augmented reality submenu 610 (shown in FIG. 6). In operation, when an AR experience is complete, the child 204 (shown in FIG. 2) is rewarded with a star. The rewards system (not shown in FIG. 11) accumulates stars for the child 204. Upon accumulation of a certain amount of stars, additional functionality is unlocked.

Figure 12:
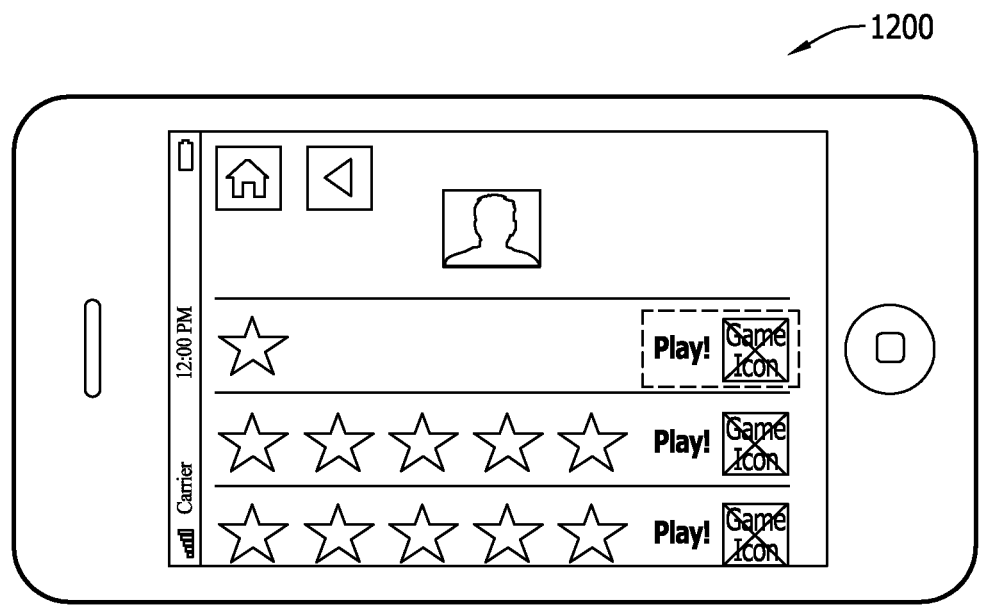
FIG. 12 is a diagram of an example user interface showing a "star board" submenu shown in FIG. 6.

FIG. 12 is a diagram of an example user interface 1200 of the "star board" submenu 640 (shown in FIG. 6), which is a part of the rewards system. In operation, the rewards system gives the child 204 (shown in FIG. 2) a view into his current progress toward unlocking additional functionality. In the exemplary illustration, games are used as the additional functionality, with one star required to unlock the first game, and 5 stars required to unlock each additional game.

Figure 13:
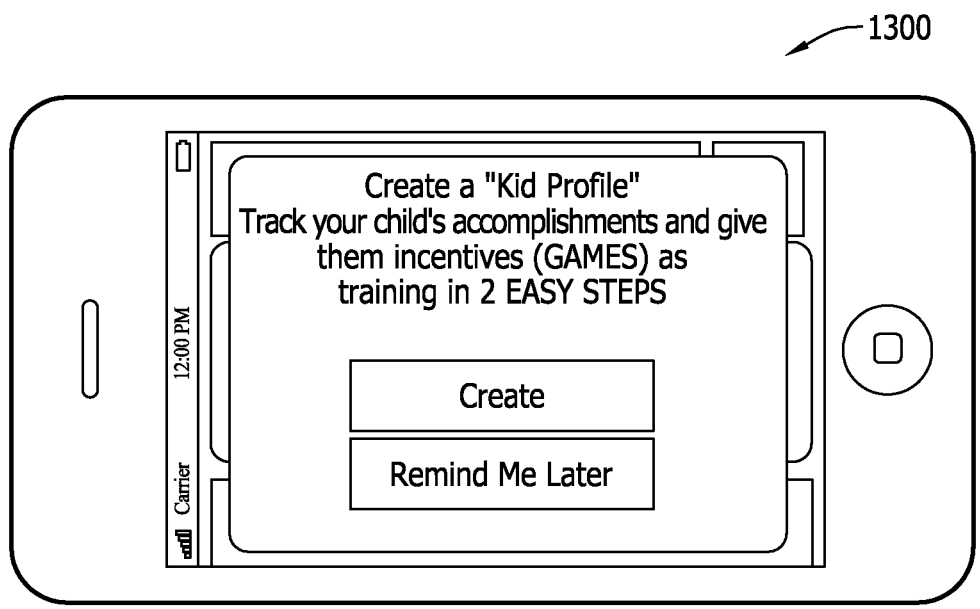
FIG. 13 is a diagram of an example user interface showing a "kid profile" submenu shown in FIG. 7.

FIG. 13 is a diagram of an example user interface 1300 of the kid profile submenu 650 (shown in FIG. 7). In operation, the TTM app maintains a profile for one or more children 204 (shown in FIG. 2) so that the parent 202 (shown in FIG. 2) can use the TTM app for multiple children, allowing the parent to track the progress of each child separately.

Figure 14:
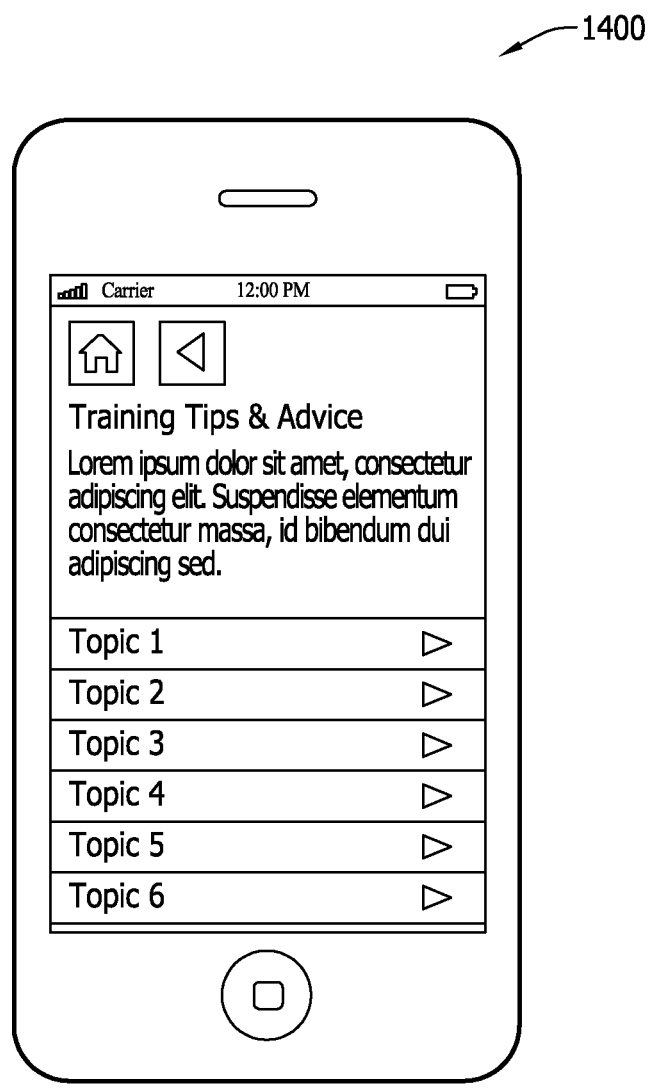
FIG. 14 is a diagram of an example user interface showing a "training tips and advice" submenu shown in FIG. 7.

FIG. 14 is a diagram of an example user interface 1400 of the training tips and advice submenu 660 (shown in FIG. 7). In the example embodiment, the training tips and advice content is static content downloaded and/or updated with the TTM app. In another embodiment, the training tips and advice content is dynamic content received upon request. Alternatively, or additionally, the training tips and advice section may redirect the user to an internet community or social media site for additional training tips and advice. In some embodiments, training tips and advice content may be provided by one or more of, without limitation, clinical experts, medical professionals, and lay experts.

Figure 15:
FIG. 15 is a diagram of an example user interface showing a "videos and songs" submenu shown in FIG. 7.

FIG. 15 is a diagram of an example user interface 1500 of the videos and songs submenu 670 (shown in FIG. 7). In the example embodiment, videos and songs are available to the child 204, 201 (shown in FIG. 2) for purposes of entertaining them while on the toilet. Alternatively, or additionally, videos and songs may be implemented in the reward system.

Figure 16:
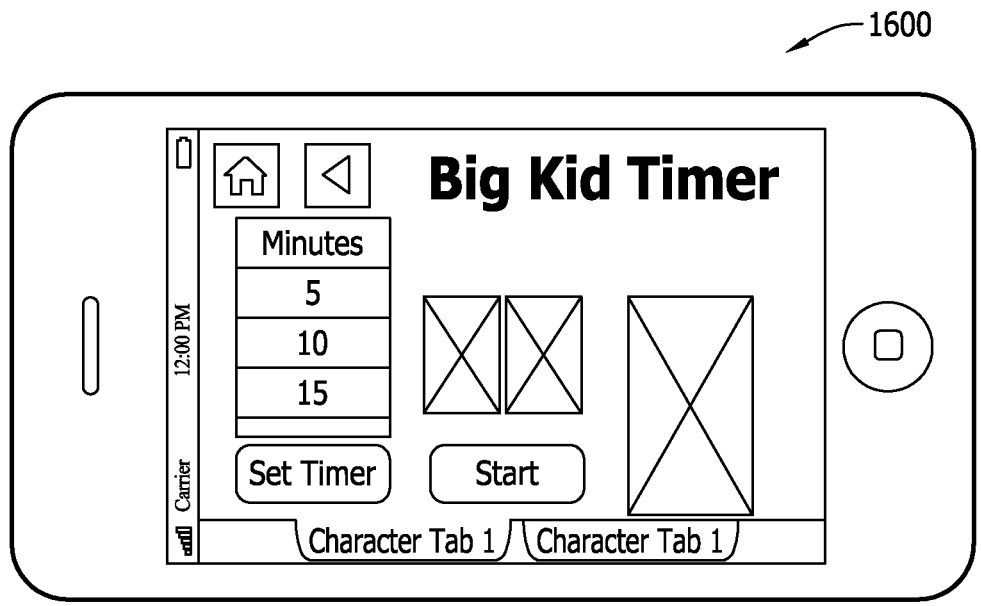
FIG. 16 is a diagram of an example user interface showing a "big kid timer" submenu shown in FIG. 7.

FIG. 16 is a diagram of an example user interface 1600 of the big kid timer submenu 680 (shown in FIG. 7). In the example embodiment, the parent 202 (shown in FIG. 2) configures an alarm to prompt the child 204 (shown in FIG. 2) to return to the toilet after either an elapsed time, or at a particular time of the day.

Figure 17:
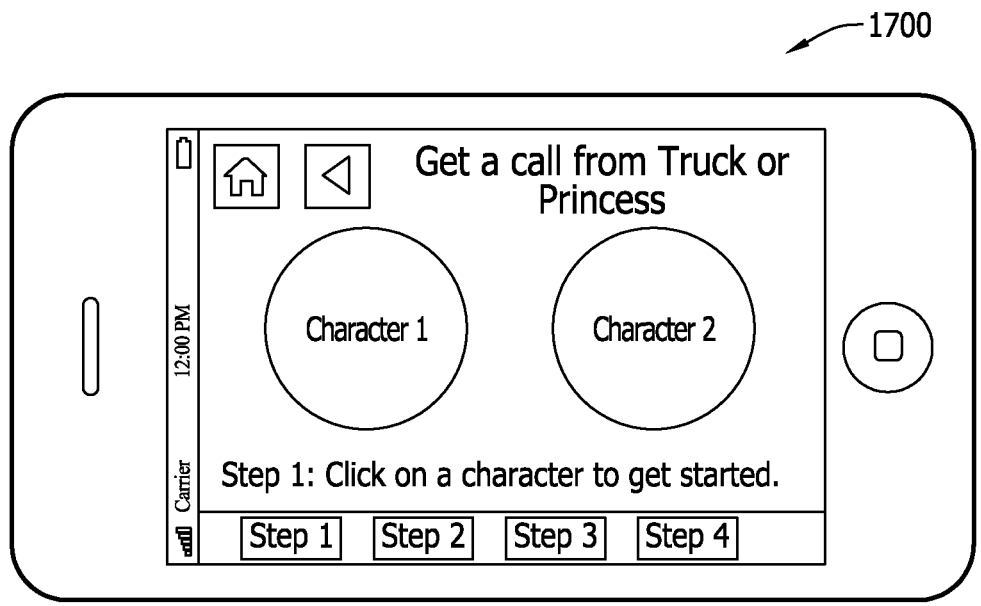
FIG. 17 is a diagram of an example user interface showing an opening screen for the character call submenu shown in FIG. 7.

FIG. 17 is a diagram of an example user interface 1700 of an opening screen for the character call submenu 690 (shown in FIG. 7). In the example embodiment, the TTM app is configured to generate a simulated phone call from an animated character. In another suitable embodiment, the TTM app is configured to generate a simulated email from an animated character. In operation, the parent 202 (shown in FIG. 2) configures the call by selecting, without limitation, which character will call the child 204 (shown in FIG. 2), when the simulated call will occur, and the contents of the email. In some embodiments, the character call may be integrated into the rewards system, or integrated with the toilet training process as the parent sees fit.

The systems and methods described herein help parents in the toilet training process by providing education, training, entertainment, a rewards system, and motivation for both the child and the parent as they engage in the process. These results are achieved by: providing a toilet training management app (the TTM app) to the parent and the child; providing a base set of functionality within the TTM app that allows the user to scan a logo image which provides an augmented reality experience; enclosing a post-sale image within a toilet training product; providing the TTM app to allow the scanning of the post-sale image in order to enable a first set of enhanced functionality to the user, where the first set of functionality includes features appropriate for the toilet training process; providing the TTM app to allow the scanning of the post-sale image in order to provide an AR experience for the child, and award "stars" for a rewards system; provide a rewards system within the TTM app, allowing the child to track their progress toward achieving milestones associated with the toilet training process, and unlocking a second set of enhanced functionality upon the child's achievement of the milestones, such as additional games, music, augmented reality content, and video content.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A method for managing toilet training of a person, said method comprising:
packaging a toilet training product within a container; and
providing a post-sale image with the container,
wherein the post-sale image is configured to unlock a first set of enhanced functionality within an installed application on a user computing device when the user computing device receives an input associated with the post-sale image, and
wherein the first set of enhanced functionality is configured to facilitate toilet training of the person, and defines a toilet training milestone associated with a toilet training event based, at least partially, on a first set of milestone input received from a user and determines that the toilet training milestone has been completed based upon a second set of milestone input from the user, wherein the second set of milestone input verifies that the child has completed a predefined toilet training event.

2. The method in accordance with claim 1, further comprising:
providing a base set of functionality within the user computing device, the user computing device having a processor coupled to a memory, a display device, and a camera device, the base set of functionality configured in an enabled status;
providing the first set of enhanced functionality within the user computing device, the first set of enhanced functionality configured in a disabled status;
capturing the post-sale image using the camera device;
utilizing at least a portion of the base set of functionality to recognize the post-sale image after capturing the post-sale image; and
reconfiguring the first set of enhanced functionality to an enabled status based at least in part on recognizing the post-sale image.

3. The method in accordance with claim 2, further comprising:
providing a second set of enhanced functionality within the user computing device configured in a disabled status;
utilizing at least a portion of the first set of enhanced functionality to identify completion of a toilet training milestone; and
reconfiguring the second set of enhanced functionality to an enabled status based at least in part on identifying completion of the toilet training milestone.

4. The method in accordance with claim 3, wherein providing a second set of enhanced functionality further comprises providing a second set of enhanced functionality that includes at least one of games, music, video content, and augmented reality content for access by the person.

5. The method in accordance with claim 1, wherein the post-sale image is further configured to cause the user computing device to display augmented reality content for use by the person as a reward for completing at least one toilet training milestone.

6. The method in accordance with claim 5, wherein the user computing device includes a processor coupled to a memory, a display device, and a camera device, the method further comprising:
capturing the post-sale image with the camera device;
recognizing the post-sale image after capturing the post-sale image; and
displaying augmented reality content, using the display device, based at least in part on recognizing the post-sale image.

7. The method in accordance with claim 1, further comprising:
providing a second image outside of the container,
wherein the second image is configured to interact with a base set of functionality stored within the user computing device, and display augmented reality content on a display device in communication with the user computing device.

8. The method in accordance with claim 1, wherein the first set of enhanced functionality includes at least one of games, photos, videos, songs, music, simulated phone calls, training tips, training articles, augmented reality book, augmented reality content, simulated training character, rewards tracking, story book, and a portal to online training content.

9. Computer-readable storage media having computer-executable instructions embodied thereon, wherein, when executed by at least one processor, the computer-executable instructions cause the processor to:
provide a base set of functionality configured in an enabled status;
provide a first set of enhanced functionality configured in a disabled status, wherein the first set of enhanced functionality is configured to provide at least one toilet training function to a person;
capture a post-sale image using a camera device in communication with the processor, the post-sale image provided with a toilet training product;
recognize the post-sale image upon capturing the post-sale image;
reconfigure the first set of enhanced functionality to an enabled status based at least in part on recognizing the post-sale image;
define a toilet training milestone associated with a toilet training event based, at least partially, on a first set of milestone input received from a user; and
determine that the toilet training milestone has been completed based upon a second set of milestone input from the user, wherein the second set of milestone input verifies that the child has completed a predefined toilet training event.

10. The computer-readable storage media in accordance with claim 9, wherein the computer-executable instructions further cause the processor to:
provide a second set of enhanced functionality configured in a disabled status;
utilize at least a portion of the first set of enhanced functionality to identify completion of a toilet training milestone; and
reconfigure the second set of enhanced functionality to an enabled status based at least in part on identifying completion of the toilet training milestone.

11. The computer-readable storage media in accordance with claim 9, wherein the computer-executable instructions further cause the processor to:
capture the post-sale image using the camera device;
recognize the post-sale image upon capturing the post-sale image; and
display augmented reality content, using a display device in communication with the processor, based at least in part on recognizing the post-sale image.

12. The computer-readable storage media in accordance with claim 11, wherein the computer-executable instructions further cause the processor to display the augmented reality content based at least in part on completion of the toilet training milestone.

13. The computer-readable storage media in accordance with claim 9, wherein the computer-executable instructions further cause the processor to utilize at least a portion of the first set of enhanced functionality to alert the person based on at least one of elapsed time and scheduled time.

14. The computer-readable storage media in accordance with claim 9, wherein the computer-executable instructions further cause the processor to provide a second set of enhanced functionality including at least one of music, videos, augmented reality content, and games.

15. A system for managing toilet training of a person, the system comprising:
a toilet training product comprising a container; and
an image provided with the container, wherein the image is configured to enable a processor in communication with a camera device to:
capture the image using the camera device;
recognize the image upon capturing the image;
enable a first set of enhanced functionality based at least in part on recognizing the image, wherein the first set of enhanced functionality is configured to facilitate toilet training of the person;
define a toilet training milestone associated with a toilet training event based, at least partially, on a first set of milestone input received from a user; and
determine that the toilet training milestone has been completed based upon a second set of milestone input from the user, wherein the second set of milestone input verifies that the child has completed a predefined toilet training event.

16. The system in accordance with claim 15, further comprising a computer system comprising:
a memory device;
a display device;
a first camera device; and
a first processor in communication with the memory device, the first camera device, and the display device, the first processor is programmed to:
provide the first set of enhanced functionality configured in a disabled status;
capture the image using the first camera device;
recognize the image upon capturing the image; and
reconfigure the first set of enhanced functionality to an enabled status based at least in part on recognizing the image.

17. The system in accordance with claim 16, wherein the first processor is further programmed to:
provide a second set of enhanced functionality configured in a disabled status;
utilize at least a portion of the first set of enhanced functionality to identify completion of a toilet training milestone; and
reconfigure the second set of enhanced functionality to an enabled status based at least in part on identifying completion of the toilet training milestone.

18. The system in accordance with claim 17, wherein the second set of enhanced functionality includes at least one of games, music, augmented reality content, and video content.

19. The system in accordance with claim 16, wherein the first processor is further programmed to:
capture the image using the first camera device;
recognize the image upon capturing the image; and
display augmented reality content, using the display device, based at least in part on recognizing the image.

20. The system in accordance with claim 19, wherein the first processor is further configured to display the augmented reality content based at least in part on completion of the toilet training milestone.

21. The system in accordance with claim 16, further comprising a second image not associated with the container, the first processor further programmed to:
capture the second image using the first camera device;
recognize the second image upon capturing the second image; and
display augmented reality content, using the display device, based at least in part on recognizing the second image.

* * * * *